United States Patent
Takezawa

(10) Patent No.: US 8,215,779 B2
(45) Date of Patent: Jul. 10, 2012

(54) PROJECTOR HAVING A PLURALITY OF LIGHT SOURCE DEVICES

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 12/498,393

(22) Filed: Jul. 7, 2009

(65) Prior Publication Data

US 2010/0007861 A1   Jan. 14, 2010

(30) Foreign Application Priority Data

Jul. 9, 2008   (JP) .................................. 2008-178728

(51) Int. Cl.
*G03B 21/20* (2006.01)
*F21V 19/02* (2006.01)

(52) U.S. Cl. .......................................... 353/87; 362/372

(58) Field of Classification Search .................... 353/94, 353/72, 87, 119; 362/240, 249, 252, 253, 362/238, 239, 269, 365, 368, 378

See application file for complete search history.

(56) References Cited

U.S. PATENT DOCUMENTS

| | | | |
|---|---|---|---|
| 6,283,614 B1 | 9/2001 | Okada et al. | |
| 6,398,367 B1 | 6/2002 | Watanabe | |
| 6,454,418 B2 * | 9/2002 | Lee et al. | 353/87 |
| 6,464,375 B1 | 10/2002 | Wada et al. | |
| 6,523,960 B2 | 2/2003 | Watanabe | |
| 6,742,898 B2 | 6/2004 | Shouji | |
| 7,111,945 B2 * | 9/2006 | Morinaga | 353/87 |
| 2002/0039176 A1 * | 4/2002 | Watanabe | 353/98 |
| 2006/0146180 A1 * | 7/2006 | Nakamura et al. | 348/375 |
| 2008/0198336 A1 * | 8/2008 | Chen et al. | 353/58 |

FOREIGN PATENT DOCUMENTS

| | | |
|---|---|---|
| JP | 2000-003612 A | 1/2000 |
| JP | 2000-206619 A | 7/2000 |
| JP | 2000-258841 A | 9/2000 |
| JP | 2001-125199 A | 5/2001 |
| JP | 2001-359025 A | 12/2001 |
| JP | 3092161 Y | 12/2002 |
| JP | 2004-062137 A | 2/2004 |
| JP | 2006-220857 A | 8/2006 |

* cited by examiner

*Primary Examiner* — Thanh X Luu
*Assistant Examiner* — Danell L Owens
(74) *Attorney, Agent, or Firm* — AdvantEdge Law Group, LLC

(57) ABSTRACT

A projector includes: a plurality of light source devices; an image projecting unit, and projects the image light; a power supply device; and an outer housing, wherein the plurality of light source devices include a same shape, a plurality of light source storage units each of which accommodates the corresponding one of the plurality of light source devices are provided inside the outer housing, an opening through which the light source devices are attached and detached in the side direction of the outer housing is formed on the outer housing, and the plurality of light source devices are inserted into the plurality of light source storage units through the opening with the same surfaces of the respective light source devices located on the upper side.

8 Claims, 9 Drawing Sheets

PROJECTOR HAVING A PLURALITY OF LIGHT SOURCE DEVICES

CROSS REFERENCE TO RELATED APPLICATIONS

The present application claims priority from Japanese Patent Application No. 2008-178728 filed on Jul. 9, 2008, which is hereby incorporated by reference in its entirety.

BACKGROUND

1. Technical Field

The present invention relates to a projector which projects image light.

2. Related Art

A projector is an optical device which forms image light by modulating lights emitted from a light source according to image information, and projects the image light on a screen or the like. The projector is used for various purposes such as a presentation held in a corporation and lessons given in a classroom. There is a demand for a projector capable of providing images having high luminance so as to increase visibility in a wide meeting room or classroom. Thus, a projector including a plurality of discharge type light sources (lamps) such as extra-high pressure mercury lamps has been proposed (for example, see JP-A-2004-62137). According to the discharge type light source, the electrode position in the arc tube provided on the light source is appropriately controlled during the manufacture process in such a manner as to emit lights with high efficiency.

Though not specifically described, it is considered that the plurality of light source devices (light sources) according to the technology disclosed in JP-A-2004-62137 are contained in positions opposite to one another in the up-down direction. It is also considered that some light sources of the light source devices are disposed in positions opposite to the position adjusted by the manufacture process in the up-down direction. When the light source is oppositely positioned, arc generated between the electrodes in the arc tube is shifted from the position adjusted by the manufacture process in some cases due to the gravity, convection of filler gas or the like. When the arc position is shifted, discharge is not efficiently achieved. In this case, decrease in luminance may be caused.

SUMMARY

It is an advantage of some aspects of the invention to provide a projector capable of solving at least a part of the problems described above.

A first aspect of the invention is directed to a projector including: a plurality of light source devices each of which has a light source; an image projecting unit which modulates lights emitted from the plurality of light source devices according to image information to form image light, and projects the image light; a power supply device which supplies power to the light source devices; and an outer housing which accommodates the light source devices, the image projecting unit, and the power supply device. The plurality of light source devices include a same shape. A plurality of light source storage units each of which accommodates the corresponding one of the plurality of light source devices are provided inside the outer housing. An opening through which the light source devices are attached and detached in the side direction of the outer housing is formed on the outer housing. The plurality of light source devices are inserted into the plurality of light source storage units through the opening with the same surfaces of the respective light source devices located on the upper side.

The side direction herein refers to a substantially horizontal direction of the projector under installation, which corresponds to the rear or left-right direction when the projection direction of image light is the front direction.

According to this structure, the light source devices are accommodated in the corresponding light source storage units with the same surfaces of the respective light source devices located on the upper side. In this case, the light source devices are stored in the outer housing with the up-down direction unchanged from that direction determined by light source adjustment process for manufacturing discharge type light sources by disposing the light sources in the light source devices in the same up-down direction of the light sources as that of the adjustment process. Thus, the position shift of arc between electrodes due to the gravity or convection of filler gas is prevented, and efficient light emission can be achieved. Accordingly, the projector can project image light having high luminance.

A second aspect of the invention is directed to the projector described above, wherein the plurality of light source devices are accommodated in the light source storage units in such positions that the emission sides for emitting the lights are opposed to each other. The opening is formed on the surface on the side of the outer housing in the direction for emitting the lights from the light source devices.

According to this structure, the plurality of light source devices are stored in the light source storage units such that the light emission sides are opposed to each other. The opening is formed on the surface on the side of the outer housing in the direction for emitting the lights from the light source devices (hereinafter referred to as "light emission direction"). Since the opening is provided on the side opposite to the side for projecting image light or on one of the side surfaces adjacent to the opposite side, efficiency of replacing the light source devices by the user improves without requiring shift of sight in various directions. Moreover, a wide space is not needed for replacing the light source devices, and thus limitation imposed on the installation of the projector decreases.

Furthermore, the necessity for providing dividing lines and concaves and convexes for forming the opening on the side surfaces other than the opening on the outer housing is eliminated. Thus, the design of the external appearance improves.

A third aspect of the invention is directed to any of the projectors described above, wherein the power supply device includes a plurality of output terminals for supplying power to the light source devices. Each of the plurality of output terminals is disposed at the corresponding one of the light source storage units. The light source devices include a plurality of input terminals each of which is connected with the corresponding one of the output terminals when inserted into the plurality of light source storage units in different directions.

According to this structure, each of the light source storage units has the output terminal, and the light source devices have the plurality of input terminals. The plurality of input terminals are connected with the corresponding output terminals by insertion of the light source devices into the light source storage units in different directions. In this case, the input terminals can be connected with the output terminals disposed at the corresponding light source storage units by inserting the light source devices into the corresponding light source storage units in different directions such as opposite positions in the front-rear direction with the upper side unchanged. Thus, the user can insert the light source devices into the light source storage units only changing the directions of the light source devices with no necessity for particular operation. Thus, replacement of the light source devices can be easily achieved.

A fourth aspect of the invention is directed to any of the projectors described above, wherein the projector further comprises covers which can be covered and set the input terminals.

According to this structure, the input terminal not connected with the output terminal is covered and set by the cover when the light source device is stored in the light source storage unit. Thus, adhesion of dirt to the input terminal and short circuit caused by accumulation of dust produced by long-term use can be prevented.

A fifth aspect of the invention is directed to any of the projectors described above, wherein each of the covers shifts to expose the input terminal connected with the output terminal and cover and set the input terminal not connected with the output terminal when the light source devices are inserted into the light source storage units.

According to this structure, the cover shifts to expose the input terminal connected with the output terminal and cover and set the input terminal not connected with the output terminal when the user inserts the light source device into the light source storage unit. Thus, the necessity for attaching and detaching the covers to and from the input terminals by the user is eliminated, and usability of the projector increases. Moreover, adhesion of dirt to the input terminal and short circuit caused by accumulation of dust produced by long-term use can be prevented.

A sixth aspect of the invention is directed to any of the projectors described above, wherein the power supply device includes a plurality of output terminals for supplying power to the light source devices. Each of the plurality of output terminals is disposed at the corresponding one of the plurality of light source storage units. The light source devices have input terminals can be shifted to connect with the corresponding output terminals.

According to this structure, the input terminals can be shifted to connect with the output terminals disposed at the plurality of light source storage units. Thus, each of the input terminals can be provided as one component. Accordingly, the number of elements included in each of the input terminals can be decreased, and reduction of the weight and cost of the light source device can be achieved.

A seventh aspect of the invention is directed to any of the projectors described above, wherein the projector further includes a lid member which closes the opening. The power supply device has a plurality of output terminals for supplying power to the light source devices. The light source devices include input terminals connected with the output terminals when inserted into the light source storage units. The output terminals are disposed at the light source storage unit and the lid member at positions corresponding to the positions of the input terminals of the light source devices accommodated in the plurality of light source storage units, the output terminal disposed at the lid member being connected with the input terminal when the lid member closes the opening.

According to this structure, the output terminals are disposed at the light source storage unit and the lid member at positions corresponding to the positions of the input terminals of the light source devices accommodated in the corresponding light source storage units. Thus, the plurality of output terminals can be disposed at the light source storage unit in such a position as to be connected with the input terminal by insertion of the light source device, and disposed not at the light source storage unit but at the lid member by using the input terminal as one component.

In this structure, the input terminal is constituted by one component and does not require a mechanism for shifting. Accordingly, the structure can be simplified, and the weight and cost of the light source device can be reduced. Moreover, the light source storage unit which does not contain the output terminal can provide a space dedicated for the output terminal in case of the light source storage unit containing the output terminal for other functions such as airflow path for cooling the light source device. Thus, efficient cooling of the light source device and other advantages can be offered.

An eighth aspect of the invention is directed to any of the projectors described above, wherein each of the light source devices has a projection exposed through the opening to be held when the light source devices are accommodated in the corresponding light source storage units.

According to this structure, each of the light source devices has a projection exposed through the opening to be held when the light source devices are accommodated in the corresponding light source storage units. In this case, the user can hold the projection to attach or detach the light source devices. Thus, easiness of operation for replacing the light source devices improves.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projector according to a first embodiment is hereinafter described with reference to the drawings. The projector in this embodiment forms image light by modulating lights emitted from a light source according to image information, and expands and projects the image light on a screen or the like. The projector is structured such that the upper side of the projector in the position to be placed on a floor or a desk is equivalent to the upper side of the projector in the position to be suspended from the ceiling.

Figure 1:
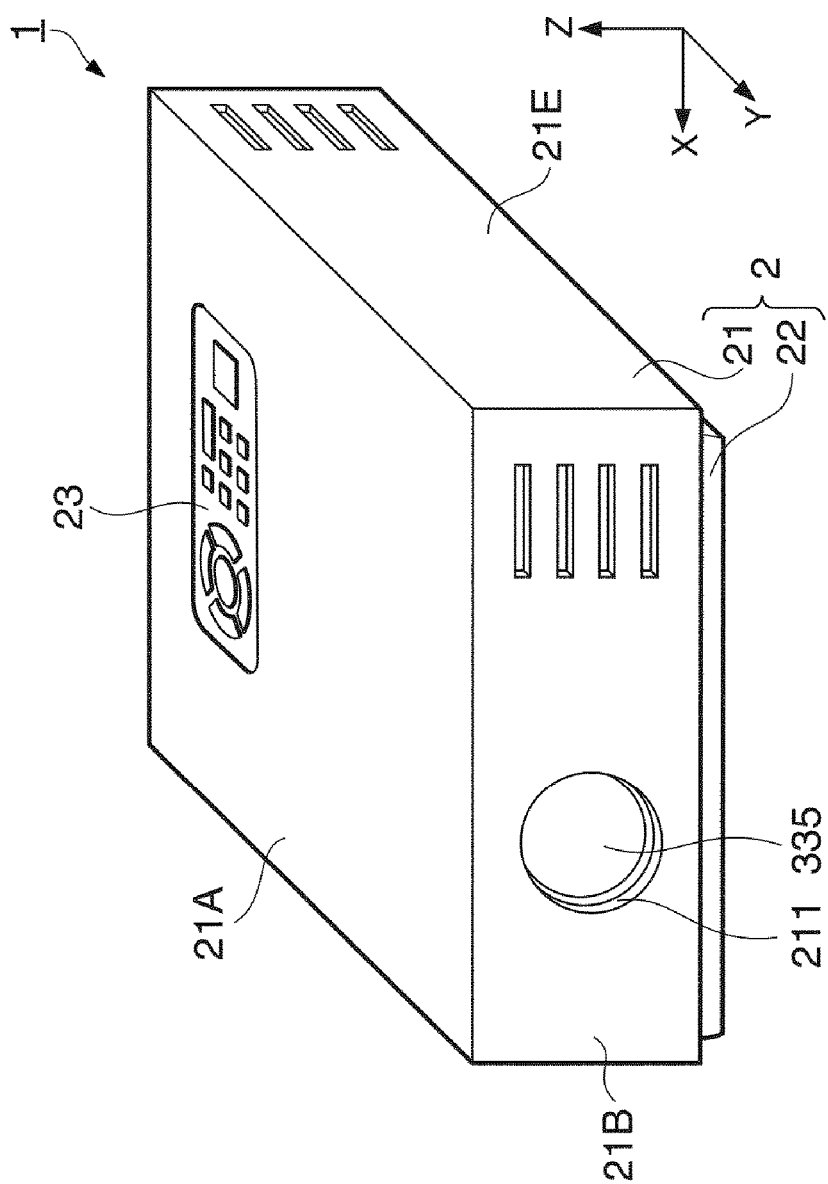
FIG. 1 is a perspective view illustrating a projector according to embodiments as viewed from the upper front.
Figure 2:
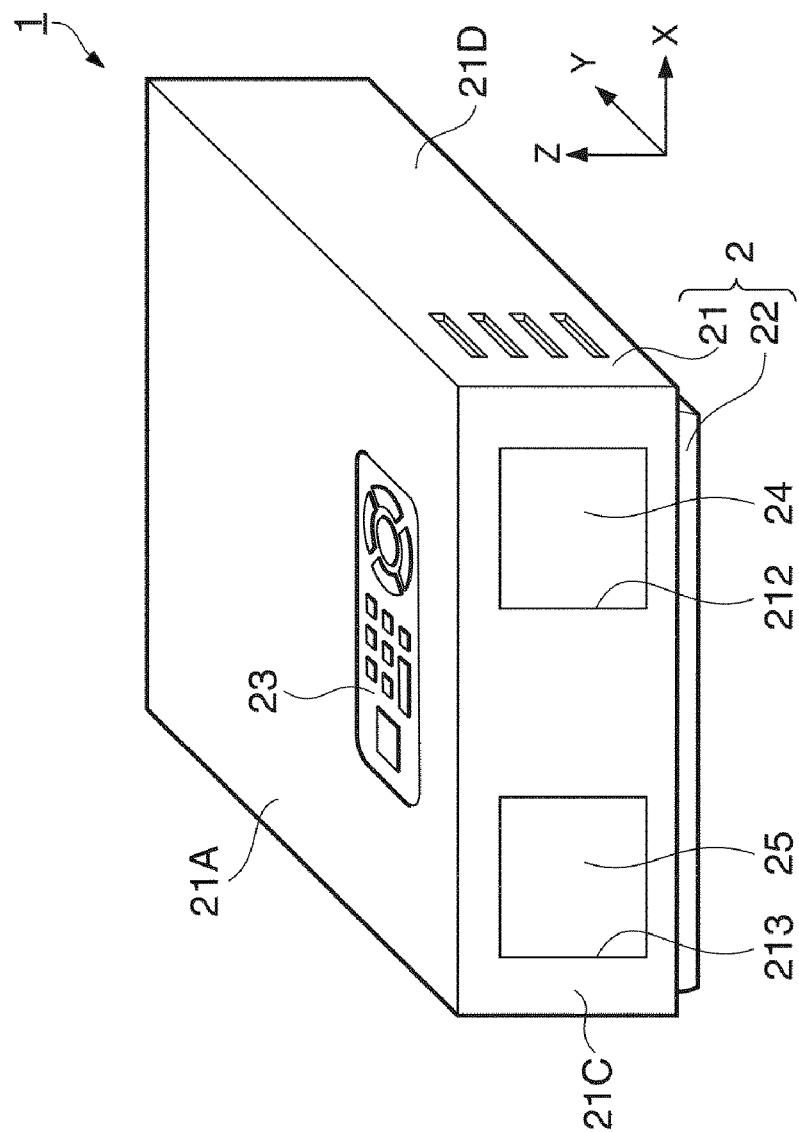
FIG. 2 is a perspective view illustrating the projector according to the embodiments as viewed from the upper rear.

FIGS. 1 and 2 illustrate an external appearance of the projector in this embodiment. FIG. 1 is a perspective view as viewed from the upper front, and FIG. 2 is a perspective view as viewed from the upper rear. In the following description, the direction for projecting image light is "front" (+Y direction), the right direction in FIG. 2 is "right" (+X direction), and the upper direction in FIG. 2 is "upper" (+Z direction) for easy understanding of the description.

As illustrated in FIGS. 1 and 2, a projector 1 has an outer housing 2 surrounding the maim body.

The outer housing 2 is made of synthetic resin, and has an upper case 21 constituted by an upper surface 21A (+Z direction), a front surface 21B (+Y direction), a rear surface 21C (−Y direction), a side surface 21D (+X direction), and a side surface 21E (−X direction), and a lower case 22 constituted by a lower surface (−Z direction). The respective surfaces of the upper case 21 and the lower case 22 are fixed to one another by screws or the like.

An operation unit 23 is provided on the rear part of the upper surface 21A of the upper case 21. The operation unit 23 has a plurality of keys or the like for providing various commands such as a power supply key for switching on/off of a power source, a menu key for switching display/non-display of a menu screen used for various settings, and a source switching key for switching input source. When the power supply key is turned on, power is supplied to light sources for emitting lights.

A substantially circular opening 211 is formed on the front surface 21B of the upper case 21, and a projection lens 335 as a projection device is disposed inside the opening 211. Image light released from the projection lens 335 is projected through the opening 211 toward the front (+Y direction).

A rectangular opening 212 is formed on the right part (+X direction) of the rear surface 21C of the upper case 21, and a rectangular opening 213 on the left part (−X direction). Light source devices 31 (see FIG. 3) described later are disposed inside the openings 212 and 213. The openings 212 and 213 are openings through which the light source device 31 is attached and detached from the side of the outer housing 2, more specifically, from the rear of the outer housing 2. The openings 212 and 213 are closed by detachable lid members 24 and 25, respectively.

Figure 3:
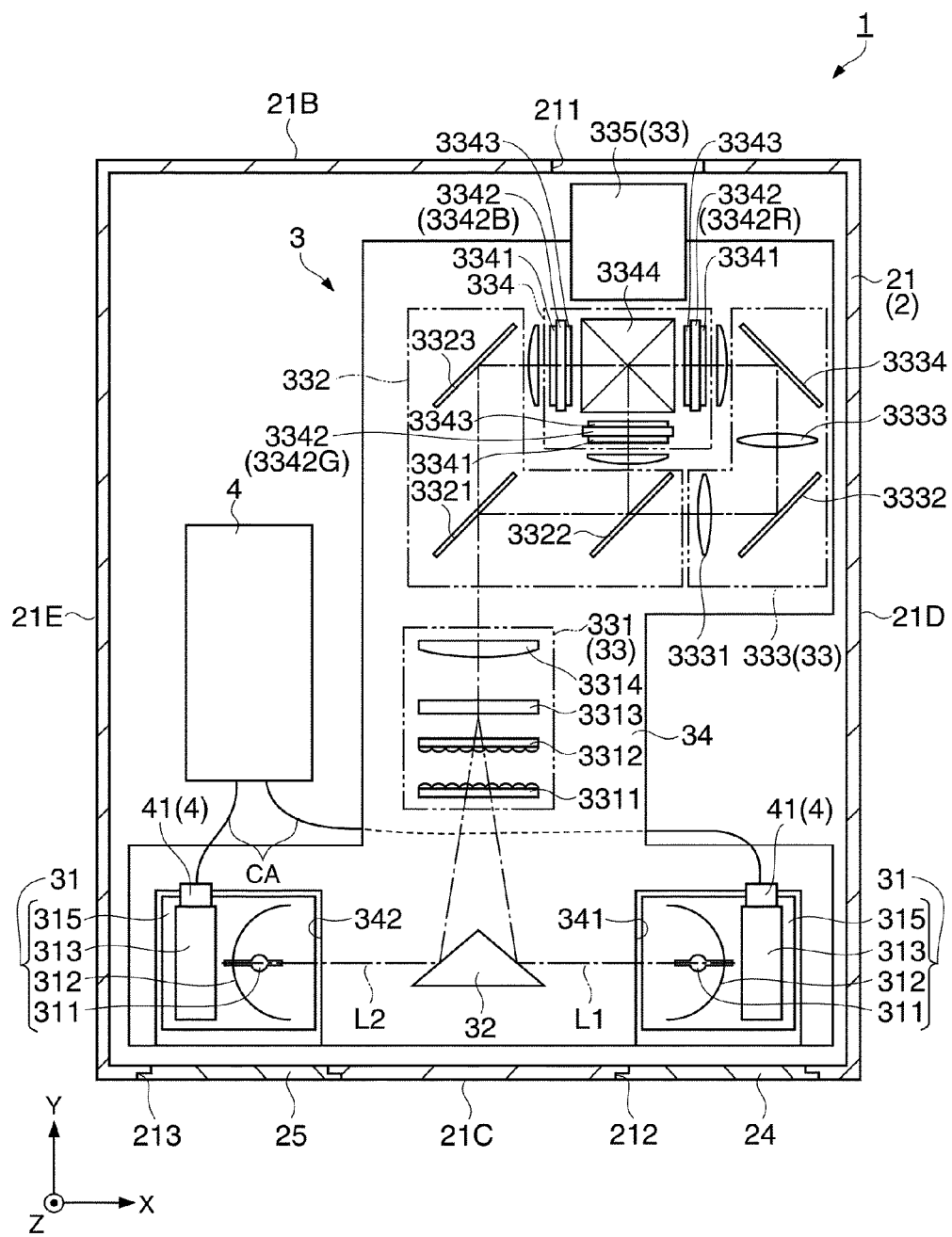
FIG. 3 schematically shows an internal structure of a projector according to a first embodiment.

FIG. 3 schematically illustrates the internal structure of the projector 1.

As illustrated in FIG. 3, the projector 1 includes an optical unit 3, a control unit (not shown), a power supply device 4 for supplying power to electronic components such as light sources 311 and the control unit, and other parts inside the outer housing 2. Though not specifically shown, a cooling fan for cooling the interior of the projector 1 and other components are disposed in the space other than the optical unit 3 and the power supply device 4 in the outer housing 2.

The optical unit 3 performs optical processing for lights emitted from the light sources 311 under control of the control unit to form and project image light corresponding to image information.

As illustrated in FIG. 3, the optical unit 3 has the two light source devices 31, a reflecting member 32, an image projecting unit 33, an optical component housing 34, and other components.

The two light source devices 31 has a same structure, and each of the light source devices 31 includes the light source 311 constituted by an extra-high pressure mercury lamp, a reflector 312, an input terminal 313, and others.

As illustrated in FIG. 3, the two light source devices 31 are disposed in the rear part of the outer housing 2 (−Y direction) such that the light emission sides of the light source devices 31 are opposed to each other and that the light emission directions of the light source devices 31, i.e., optical axes L1 and L2 extend in the left-right direction (±X direction). The light source devices 31 equalize the emission directions of lights emitted from the light sources 311 by using the reflector 312, and emit the equalized lights toward the reflecting member 32. Each of the light sources 311 is not limited to an extra-high pressure mercury lamp but may be other light sources such as a metal halide lamp. The input terminals 313 are connected with output terminals 41 of the power supply device 4 described later such that power can be supplied to the light source devices 31 via the input terminals 313 from the power supply device 4. The details of the light source devices 31 will be described later.

The reflecting member 32 disposed between the two light source devices 31 has reflection mirrors on two surfaces of the triangle pole shape. The reflecting member 32 reflects lights emitted from the light source devices 31 toward the front (+Y direction).

The image projecting unit 33 includes an illumination device 331, a color separation device 332, a relay device 333, an electro-optic device 334, and the projection lens 335.

The illumination device 331 has a first lens array 3311, a second lens array 3312, a polarization conversion element 3313, and a superimposing lens 3314, and performs optical processing for the lights reflected by the reflecting member 32 such that approximately uniform illumination can be supplied to an image forming area of a liquid crystal panel 3342 described later.

The color separation device 332 includes a first dichroic mirror 3321, a second dichroic mirror 3322, and a reflection mirror 3323, and has a function of separating the lights released from the illumination device 331 into three color lights of red light (hereinafter referred to as "R light"), green light (hereinafter referred to as "G light"), and blue light (hereinafter referred to as "B light").

The relay device 333 includes an entrance lens 3331, a relay lens 3333, and reflection mirrors 3332 and 3334, and has a function of introducing the R light having passed the second dichroic mirror 3322 to a liquid crystal panel 3342R for R light. The relay device 333 of the optical unit 3 for guiding the R light may guide the B light instead of the R light, for example.

The electro-optic device 334 includes entrance side polarization plates 3341, liquid crystal panels 3342 as light modulation devices, exit side polarization plates 3343, and a cross dichroic prism 3344 as a color combining device, and modulates the respective color lights released from the color separation device 332 according to image information to form image light.

The projection lens 335 is constituted by a combination of plurality of lenses. The projection lens 335 expands the image light released from the electro-optic device 334 and projects the expanded image light to the screen (not shown) or the like.

The optical component housing 34 is made of high heat resistance material, and contains the optical components such as the light source devices 31, the reflecting member 32, and the image projecting unit 33 at predetermined positions. The optical component housing 34 has light source storage units 341 and 342 each of which accommodates the corresponding one of the two light source devices 31.

The control unit includes a CPU (central processing unit), a ROM (read only memory), a RAM (random access memory) and the like to function as a computer. The control unit performs control over operation of the projector 1 such as control associated with projection of images.

Though not specifically shown in the figure, the power supply device 4 includes a power supply block and two light source drive blocks for driving the two light source devices 31, and supplies power to the electronic components such as the control unit and the light sources 311. The light source drive blocks may be a single block capable of driving both the light source devices 31.

As illustrated in FIG. 3, the power supply device 4 has the two output terminals 41 for supplying power to the light source devices 31. Each of the output terminals 41 is constituted by a connector having two cores of receptacle as concave connections, and accommodated in the corresponding light source storage unit 341 or 342 via a cable CA. The output terminals 41 are fixed to the optical component housing 34 in such positions as to be connected with the input terminals 313 when the light source devices 31 are attached.

The details of the light source devices 31 are now discussed.

Figure 4:
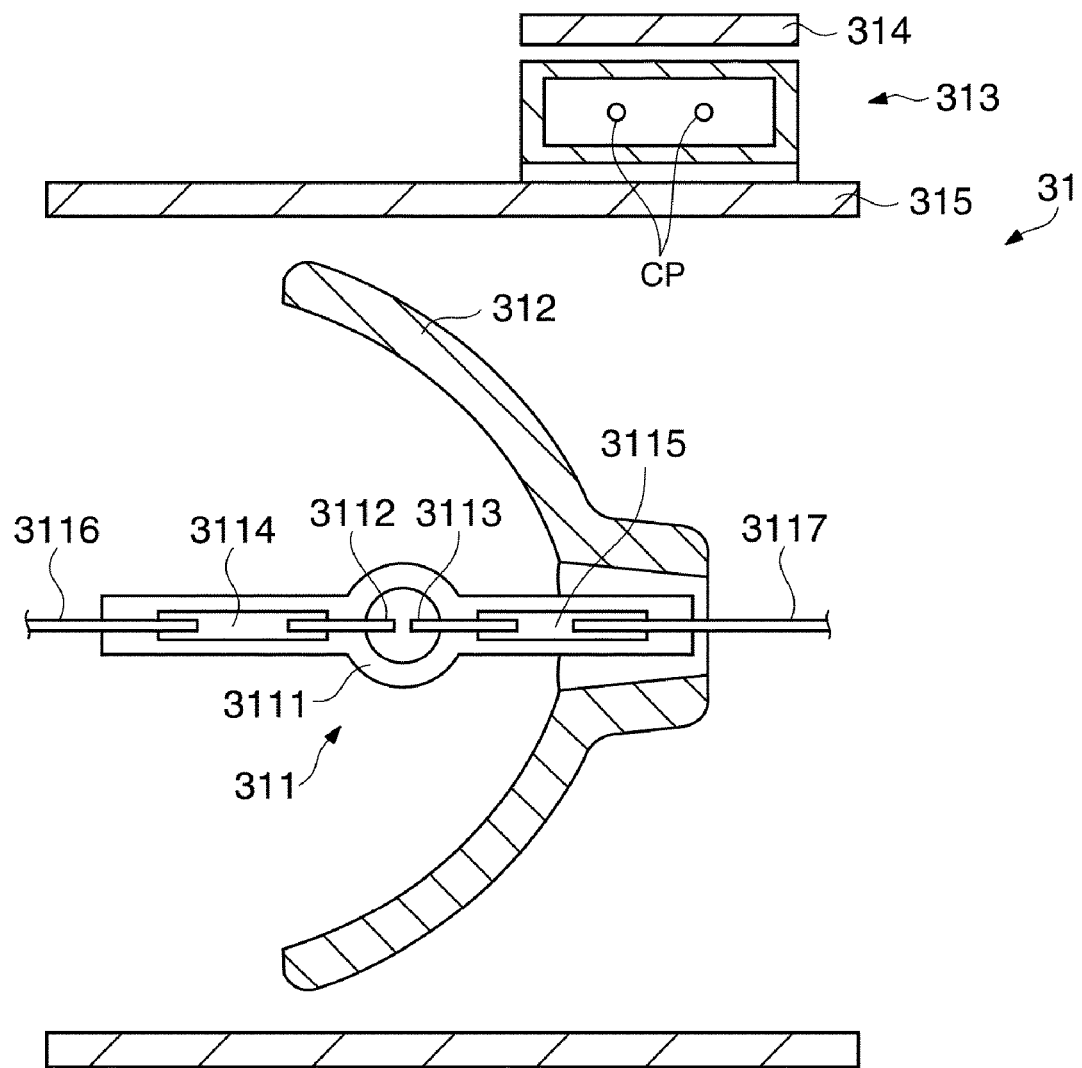
FIG. 4 is a cross-sectional view showing a light source device according to the first embodiment.
Figure 5:
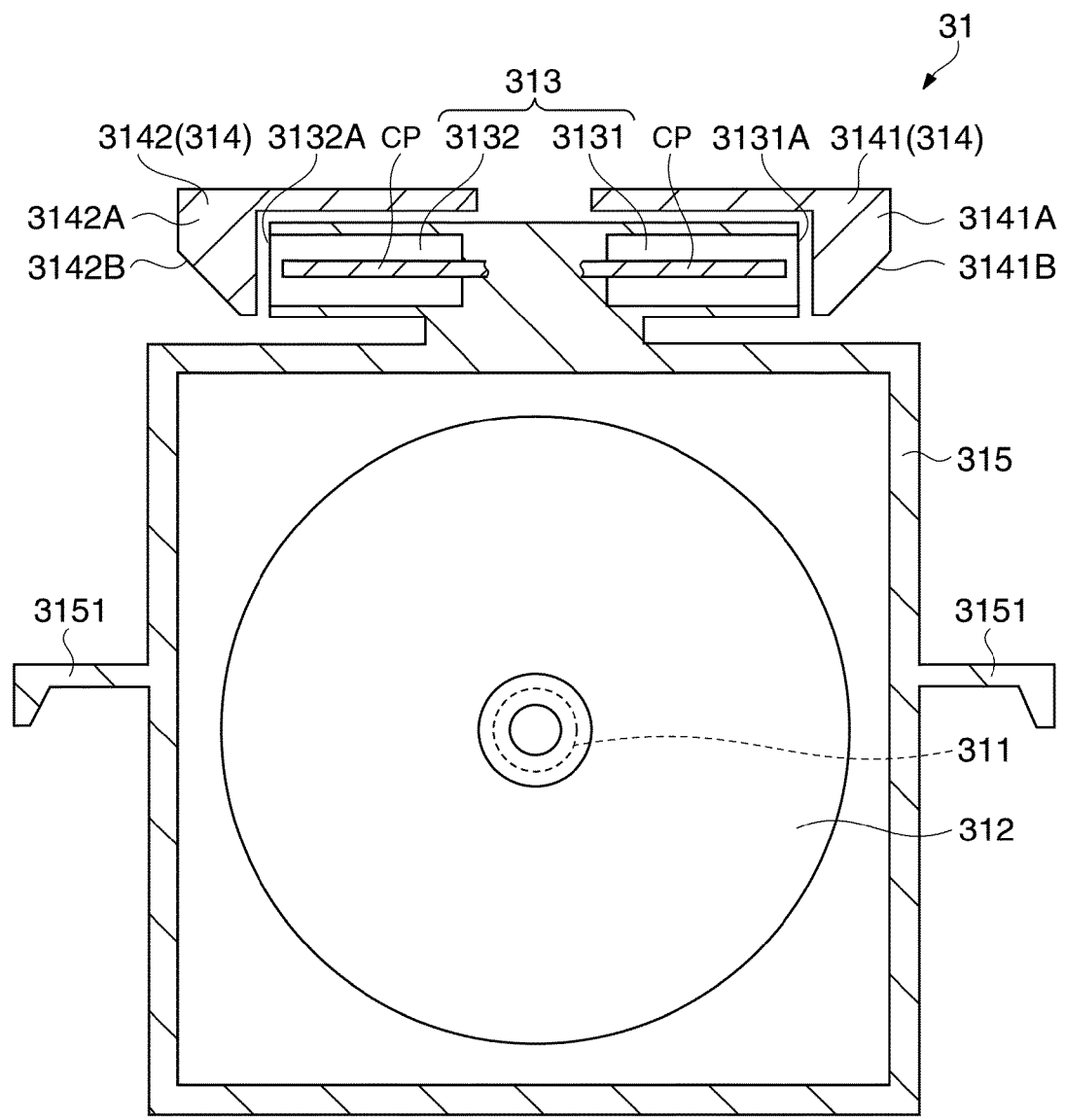
FIG. 5 is a cross-sectional view showing the light source device according to the first embodiment.

FIGS. 4 and 5 are cross-sectional views showing one of the light source devices 31. FIG. 4 illustrates the light source device 31 as viewed in a direction approximately parallel with the direction of emitted lights, and FIG. 5 illustrates the light source device 31 as viewed in a direction approximately orthogonal to the direction of emitted lights. As illustrated in FIGS. 4 and 5, the light source device 31 has a cover 314 and a light source housing 315 as well as the light source 311, the reflector 312, and the input terminal 313.

As illustrated in FIG. 4, the light source 311 has an arc tube 3111, electrodes 3112 and 3113, metal foils 3114 and 3115, and leads 3116 and 3117.

The arc tube 3111 is made of heat resistance glass, and has a spherical light emission portion at the center. The arc tune 3111 has a pair of cylindrical sealing portions continuing from both ends of the light emission portion. Mercury, rare gas and the like are sealed into the light emission portion.

The tips of the electrodes 3112 and 3113 are disposed opposed to and close to each other within the light emission portion, and the base ends of the electrodes 3112 and 3113 are connected with the metal foils 3114 and 3115 and supported by the sealing portions.

The light source 311 emits light by discharge generated between the electrodes 3112 and 3113 opposed to and close to each other when power is supplied to the electrodes 3112 and 3113. As a result, heat convection is caused within the light emission portion due to heat generation resulting from light emission. Thus, arc generated between the electrodes 3112 and 3113 is curved upward in the vertical direction, and the center position of the arc is shifted upward from the center position between the electrodes.

The electrodes 3112 and 3113 are attached to the reflector 312 in such positions that the arc can be located at an appropriate position by the manufacture adjustment process. Thus, the light source device 31 can efficiently emit lights.

One ends of the leads 3116 and 3117 are connected with the ends of the metal foils 3114 and 3115, and the other ends are extended to the outside.

The reflector 312 has a parabolic mirror to reflect radial lights emitted from the light source 311 and release the lights as substantially parallel lights. The reflector 312 is not limited to the parabolic mirror but may be a structure having a collimating concave lens on the emission surface of the reflector 312 as ellipsoidal mirror.

The light source housing 315 has a substantially rectangular parallelepiped box shape, and has an opening on the side surface facing the other light source housing 315. The light source 311 and the reflector 312 are disposed within the light source housing 315 such that lights can be emitted through one of the openings of the light source housings 315 and that the upper side of the light source 311 determined by the adjustment process becomes the upper side of the light source device 31.

As illustrated in FIG. 5, a projection (holding portion 3151) projecting to the outside to be held is formed on each of the remaining two side surfaces of the light source housing 315.

The holding portions 3151 have such a shape as to be easily held by hand. Thus, the light source devices 31 can be easily attached and detached to and from the light source storage units 341 and 342.

As illustrated in FIGS. 4 and 5, the input terminal 313 has a first input pin 3131 and a second input pin 3132, and is disposed above the light source housing 315.

Each of the first input pin 3131 and the second input pin 3132 is a connecter having two cores of plug CP as a pin-shaped connection. The two cores of the plug CP are connected with the leads 3116 and 3117 via not-shown cables. The plug CP is surrounded by a component having a substantially rectangular parallelepiped box shape and made of synthetic resin. The end of the plug CP is exposed through an opening formed on one of the side surfaces of the box-shaped component.

The first input pin 3131 and the second input pin 3132 are disposed back to back, and connecting sides 3131A and 3132A having the exposed ends of the plug CP face in directions substantially orthogonal to the light emission directions. The plug CP of the first input pin 3131 and the second input pin 3132 engages with the receptacle of the output terminal 41 when the output terminal 41 is inserted from the connecting sides 3131A and 3132A. As a result, the first input pin 3131 and the second input pin 3132 connect with the output terminal 41.

As illustrated in FIG. 5, the cover 314 has a first cover 3141 and a second cover 3142 having a same shape and disposed above the first input pin 3131 and the second input pin 3132, respectively. The first cover 3141 and the second cover 3142 shift in the up-down direction to expose and cover and set the plug CP of the first input pin 3131 and the second input pin 3132.

More specifically, the first cover 3141 is made of synthetic resin and has an L-shaped cross section. One piece 3141A of the L shape is so disposed as to cover and set the connecting side 3131A of the first input pin 3131. The piece 3141A is supported by a not-shown supporting member and urged by a not-shown spring toward the first input pin 3131. The end of the piece 3141A has a slope 3141B to have a thin end.

The second cover 3142 has a similar structure as that of the first cover 3141. One piece 3142A of the L shape is so disposed as to cover and set the connecting side 3132A of the second input pin 3132. The end of the piece 3142A has a slope 3142B.

When force resisting the urging force of the spring is applied to the first cover 3141 and the second cover 3142, the first cover 3141 and the second cover 3142 shift upward so as to expose the plug CP of the first input pin 3131 and the second input pin 3132.

The operation for storing the light source devices 31 in the light source storage units 341 and 342 is now discussed.

Figure 6:
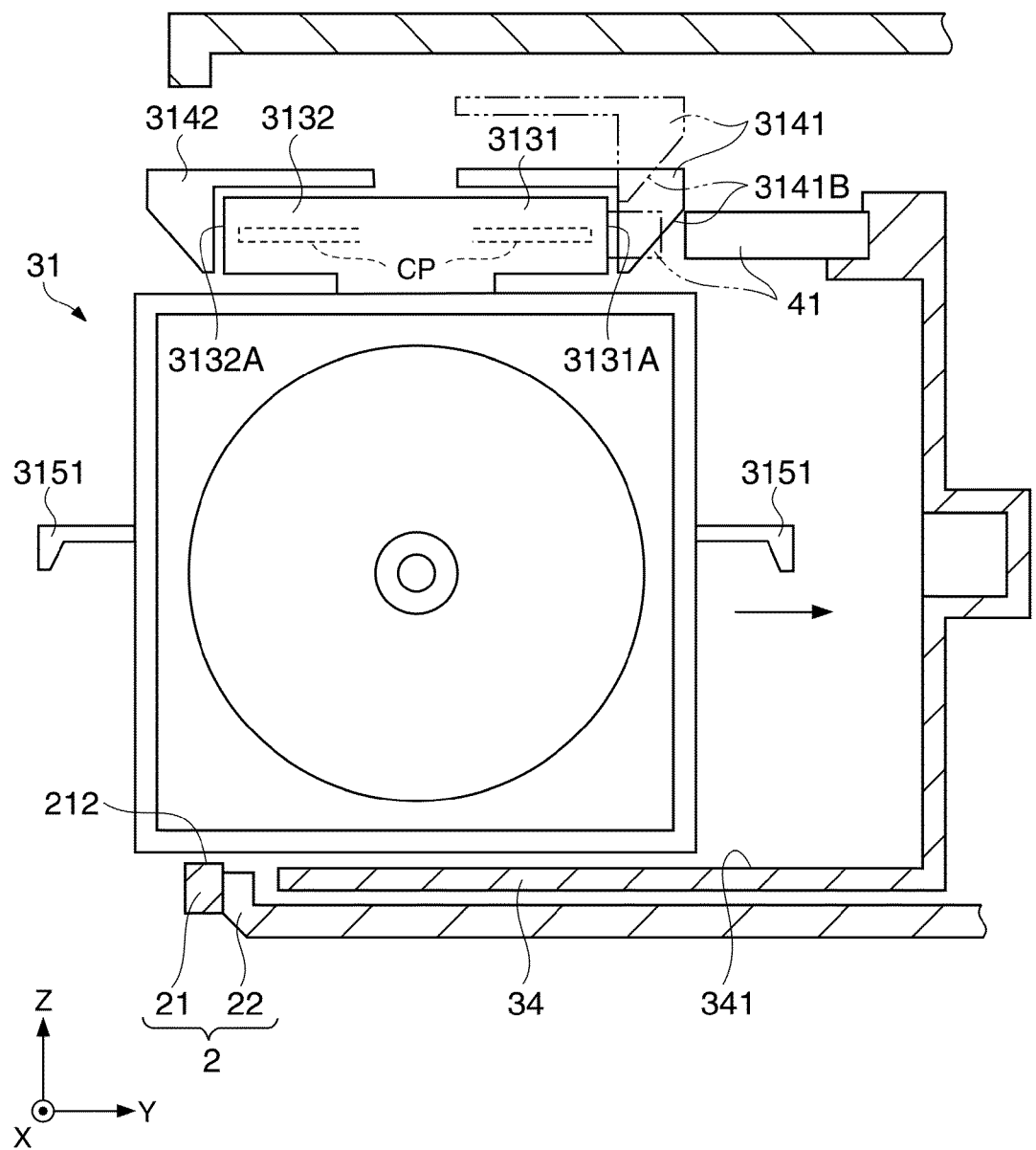
FIG. 6 is a cross-sectional view illustrating the rear part of the projector.

FIG. 6 is a cross-sectional view illustrating the rear part of the projector 1, showing the light source device 31 accommodated in the light source storage unit 341 as viewed from the side.

As illustrated in FIG. 6, the first cover 3141 and the second cover 3142 cover and set the first input pin 3131 and the second input pin 3132 when the light source device 31 is not contained in the light source storage unit 341.

For storing the light source device 31 in the light source storage unit 341, the light source device 31 is inserted toward the front through the opening 212 in such a condition that the connecting side 3131A of the first input pin 3131 faces the front (+Y direction) and that the light emission side faces the left (−X direction). When the slope 3141B of the first cover 3141 contacts the edge of the output terminal 41, upward force is applied to the first cover 3141. As a result, the first cover 3141 gradually shifts upward. Then, the plug CP gradually comes to be exposed, and the first input pin 3131 is gradually inserted to the output terminal 41 accommodated in the light source storage unit 341.

While the light source device 31 is accommodated in the light source storage unit 341, the first input pin 3131 engages with the output terminal 41 (as indicated by an alternate long and two short dashes line in FIG. 6), that is, the plug CP engages with the receptacle. As a result, the first input pin 3131 connects with the output terminal 41, allowing power to be supplied from the power supply device 4 to the light source device 31 accommodated in the light source storage unit 341. In this condition, the second cover 3142 keeps covering and setting the second input pin 3132.

The light source device 31 accommodated in the light source storage unit 341 can be removed from the light source storage unit 341 by pulling the holding portion 3151 exposed through the opening 212 to the side of the opening 212 by hand to disengage the plug CP from the receptacle. In this condition, the first cover 3141 again shifts to cover and set the first input pin 3131.

Though not shown in the figure, the light source device 31 to be stored in the light source storage unit 342 is oppositely positioned in the front-rear direction to the light source device 31 to be stored in the light source storage unit 341 with the upper side of the light source device 31 unchanged. That is, the light source device 31 is inserted into the light source storage unit 342 through the opening 213 (FIG. 3) with the connecting side 3132A of the second input pin 3132 facing the front (+Y direction) and the light emission side facing the right direction (+X direction). In this case, the second input pin 3132 connects with the output terminal 41 in the similar manner, allowing power to be supplied from the power supply device 4 to the light source device 31. In this condition, the first cover 3141 keeps covering and setting the first input pin 3131.

The light source device 31 accommodated in the light source storage unit 342 can be removed from the light source storage unit 342 by pulling the holding portion 3151 exposed through the opening 213 to the side of the opening 213 by hand to disengage the plug CP from the receptacle. In this condition, the second cover 3142 again shifts to cover and set the second input pin 3132.

Thus, the openings 212 and 213 are formed on the surface (rear surface 21C) on the side of the outer housing 2 in the emission direction of lights emitted from the light source devices 31. The two light source devices 31 are reversely positioned in the front-rear direction with the upper sides unchanged, and inserted into the light source storage units 341 and 342 through the openings 212 and 213. By insertion of the light source devices 31 into the light source storage units 341 and 342 in different directions, the input pins 3131 and 3132 connect with the corresponding output terminals 41 disposed at the light source storage unit 341 and 342. During insertion of the light source devices 31 into the light source storage units 341 and 342, the covers 314 shift to expose the input terminal 313 connected with the output terminal 41 and cover and set the input terminal 313 not connected with the output terminal 41.

Accordingly, the projector 1 in this embodiment provides the following advantages.

(1) The light sources 311 are accommodated in the light source storage units 341 and 342 with the up-down direction unchanged from the direction determined by the adjustment process. Thus, the position shift of arc due to the gravity or convection of filler gas is prevented, and lights are efficiently emitted from the light source devices 31. Accordingly, the projector 1 can project image light having high luminance.

(2) Since the two light source devices 31 have the same shape, the necessity for forming the light source devices 31 having different shapes exclusively for the light source storage units 341 and 342 is eliminated. Thus, cost reduction can be achieved by decreasing the number of parts, and component management required for after sales service can be simplified.

(3) The two light source devices 31 are attached and detached from the rear side of the outer housing 2. Thus, the efficiency of replacing the light source devices 31 improves with no need of sight shift in various directions. Since a wide space is needed only in the rear direction for replacing the light source devices 31, limitation imposed on the installation of the projector 1 can be reduced.

(4) The openings 212 and 213 are formed only on the rear surface 21C, and dividing lines and concaves and convexes for forming the openings 212 and 213 are not needed on the side surfaces 21D and 21E. Thus, the design of the external appearance improves. In addition, since the openings 212 and 213 are disposed on the side opposite to the projecting side of image light, the appearance further improves by disposing the rear of the projector 1 on the side not easily recognized by the user.

(5) Since each of the light source devices 31 has the first input pin 3131 and the second input pin 3132, the user can insert the light source devices 31 into the light source storage units 341 and 342 only by changing the directions of the light source devices 31 without particular operation. Thus, replacement of the light source devices 31 can be easily achieved.

(6) Since each of the light source devices 31 has the cover 314, adhesion of dirt to the first input pin 3131 and the second input pin 3132 not connected and short circuit caused by accumulation of dust produced by long-term use can be prevented. When the light source devices 31 are inserted into the light source storage units 341 and 342, the cover shifts to expose the input terminal 313 connected with the output terminal 41 and cover and set the input terminal 313 not connected with the output terminal 41. Thus, the necessity for attaching and detaching the covers to and from the input terminals 313 by the user is eliminated, and usability of the projector 1 improves.

(7) According to this structure, the user can easily attach and detach the light source devices 31 by using the holding portions 3151 provided on the light source devices 31. Thus, the easiness of replacement of the light source devices 31 increases.

Second Embodiment

The projector 1 according to a second embodiment is now described with reference to the drawings. The projector 1 in this embodiment includes the light source devices 31 different from those in the first embodiment.

Figure 7:
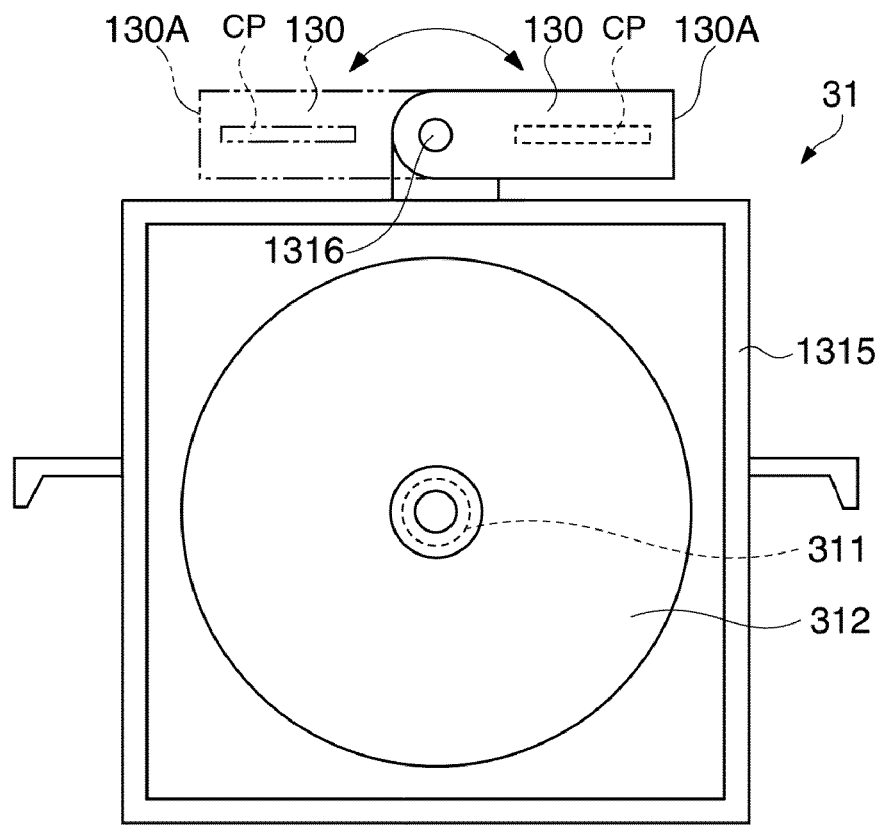
FIG. 7 is a side view illustrating a light source device according to a second embodiment.

FIG. 7 is a side view showing one of the light source devices 31 in this embodiment.

As illustrated in FIG. 7, the light source device 31 in this embodiment has an input terminal 130 having a structure different from that of the input terminal 313 in the first embodiment, and does not have the cover 314. The light source device 31 in this embodiment also has a light source housing 1315 having an upper portion different in shape from that of the light source housing 315 in the first embodiment.

The input terminal 130 is a connector having two cores of the plug CP. A circular hole is formed on one end of a substantially rectangular parallelepiped box shape component for surrounding the plug CP in a direction approximately orthogonal to the longitudinal direction of the plug CP.

A shaft 1316 having a center axis in the light emission direction is provided above the light source housing 1315.

The shaft 1316 of the input terminal 130 is inserted into the circular hole in such a manner as to be rotatable through approximately 180 degrees. The direction of a connecting side 130A through which the end of the plug CP is exposed can be changed by rotation of the input terminal 130.

The direction of the connecting side 130A of the light source device 31 to be stored in the light source storage unit 341 can be varied from that of the light source device 31 to be stored in the light source storage unit 342.

More specifically, the light source device 31 to be stored in the light source storage unit 341 is inserted through the opening 212 into the light source storage unit 341 in such a condition that the light emission side faces the left direction (−X direction) and that the connecting side 130A faces the front by rotation of the input terminal 130.

On the other hand, the light source device 31 to be stored in the light source storage unit 342 is inserted through the opening 213 into the light source storage unit 342 in such a condition that the light emission side faces the right direction (+X direction) and that the connecting side 130A faces the front by rotation of the input terminal 130. By insertion of the light source devices 31 into the corresponding light source storage units 341 and 342, the input terminals 130 connect with the output terminals 41 disposed at the light source storage units 341 and 342.

Accordingly, the input terminals 130 can be shifted to connect with the corresponding output terminals 41 positioned at the light source storage units 341 and 342.

Each of the input terminal 130 and the light source housing 1315 has a not-shown engaging portion such that the position of the input terminal 130 is not shifted by engagement between the engaging portions of the input terminal 130 and the light source housing 1315 when the direction of the input terminal 130 is changed. These engaging portions can be easily disengaged by operation of the user.

As described above, the projector 1 according to this embodiment provides the following advantages as well as the advantage (1) through (4) and (7).

The input terminals 130 as single connectors can be shifted to connect with the output terminals 41 disposed at the light source storage units 341 and 342. Thus, the number of the components contained in the input terminal 130 can be decreased, and reduction in the weight and cost of the light source device 31 can be achieved.

Third Embodiment

Figure 8:
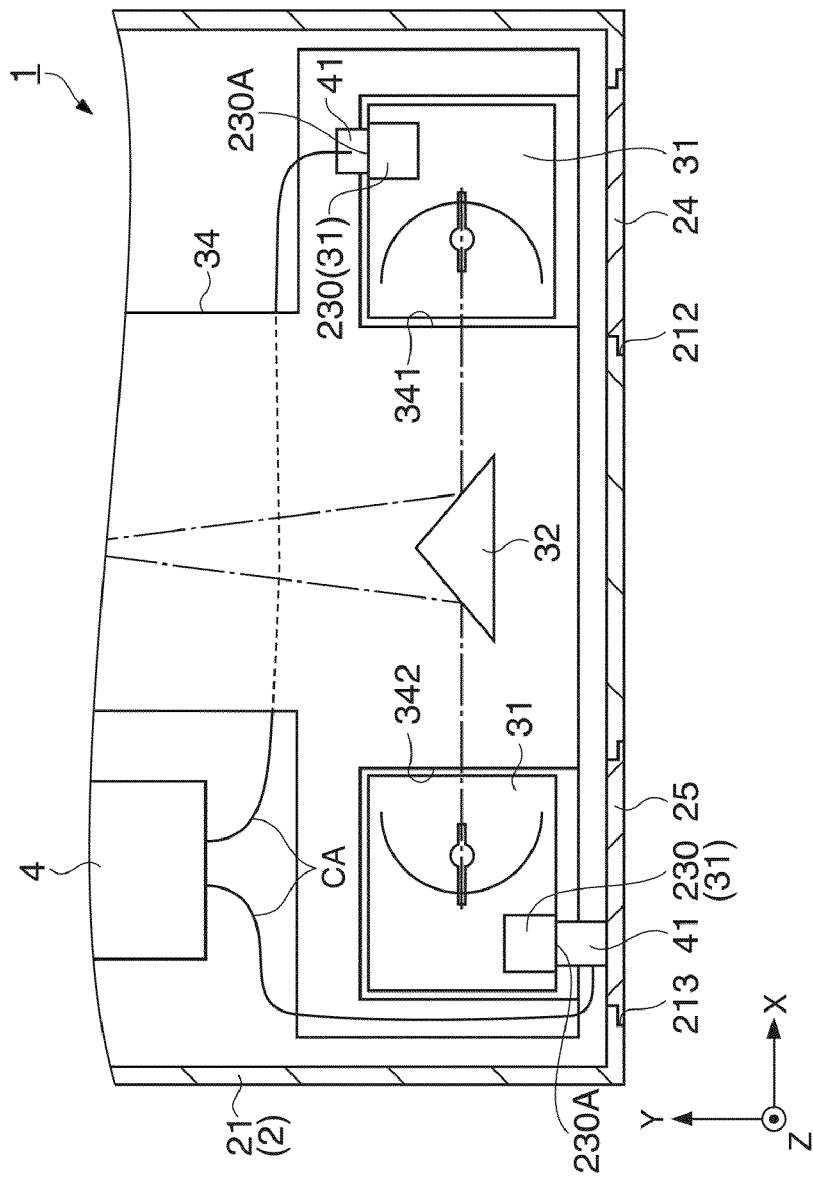
FIG. 8 is a plan view illustrating a rear part of a projector according to a third embodiment.

The projector 1 according to a third embodiment is now described with reference to the drawings. The projector 1 in this embodiment includes the light source devices 31 having a structure different from that of the light source devices 31 in the first embodiment, and one of the two output terminals 41 is disposed at a position different from that of the output terminal 41 in the first embodiment. FIG. 8 is a plan view illustrating the rear part of the projector 1 in this embodiment.

As illustrated in FIG. 8, each of the light source devices 31 has an input terminal 230 having a structure different from that of the input terminal 313 in the first embodiment, and does not have the cover 314.

The input terminal 230 is a connector having two cores of the plug CP, and is attached to the light source device 31 such that a connecting side 230A through which the end of the plug CP is exposed faces the front (+Y direction) when stored in the light source storage unit 341 as illustrated in FIG. 8. The connecting side 230A of the input terminal 230 faces the rear (−Y direction) when the light source device 31 is stored in the light source storage unit 342.

One of the two output terminals 41 is disposed at the light source storage unit 341 similarly to the structure in the first embodiment, and the other is disposed inside the lid member 25.

The output terminal 41 located inside the lid member 25 is fixed to such a position as to be connected with the input terminal 230 of the light source device 31 accommodated in the light source storage unit 342 when the lid member 25 closes the opening unit 213.

Similarly to the first embodiment, the two light source devices 31 are inserted into the light source storage units 341 and 342 through the openings 212 and 213. The input terminal 230 of the light source device 31 inserted into the light source storage unit 341 is connected to the output terminal 41 at the time of attachment similarly to the first embodiment. On the other hand, the input terminal 230 of the light source device 31 inserted into the light source storage unit 342 is connected with the output terminal 41 disposed in the lid member 25 after attachment by closing the opening 213 by the lid member 25. As a result, power is allowed to be supplied from the power supply device 4 to the two light source devices 31.

As can be understood, the two output terminals 41 are disposed at the light source storage unit 341 and the lid member 25 at positions corresponding to the input terminals 230 of the light source devices 31 stored in the light source storage units 341 and 342. The output terminal 41 disposed at the light source storage unit 341 connects with the input terminal 230 when the light source device 31 is inserted into the light source storage unit 341. The output terminal 41 disposed at the lid member 25 connects with the input terminal 230 when the lid member 25 closes the opening 213.

As described above, the projector 1 according to this embodiment provides the following advantages as well as the advantages (1) through (4) and (7) in the first embodiment.

The input terminal 230 is constituted by a connector which does not require a shifting mechanism. Thus, the structure can be simplified, and the weight and cost of the light source device 31 can be reduced.

Moreover, the light source storage unit 342 which does not contain the output terminal 41 can provide a space dedicated for the output terminal 41 in case of the light source storage unit 341 for other functions such as an airflow path for cooling the light source device 31. Thus, efficient cooling of the light source device 31 and other advantages can be offered.

Fourth Embodiment

The projector 1 according to a fourth embodiment is now discussed with reference to the drawings. The projector 1 according to this embodiment is different from that of the third embodiment in that the output terminal 41 connected with the input terminal 230 of the light source device 31 accommodated in the light source storage unit 342 is disposed at a different position, and that a lid unit 250 having an additional component attached to the lid member 25 is provided.

Figure 9:
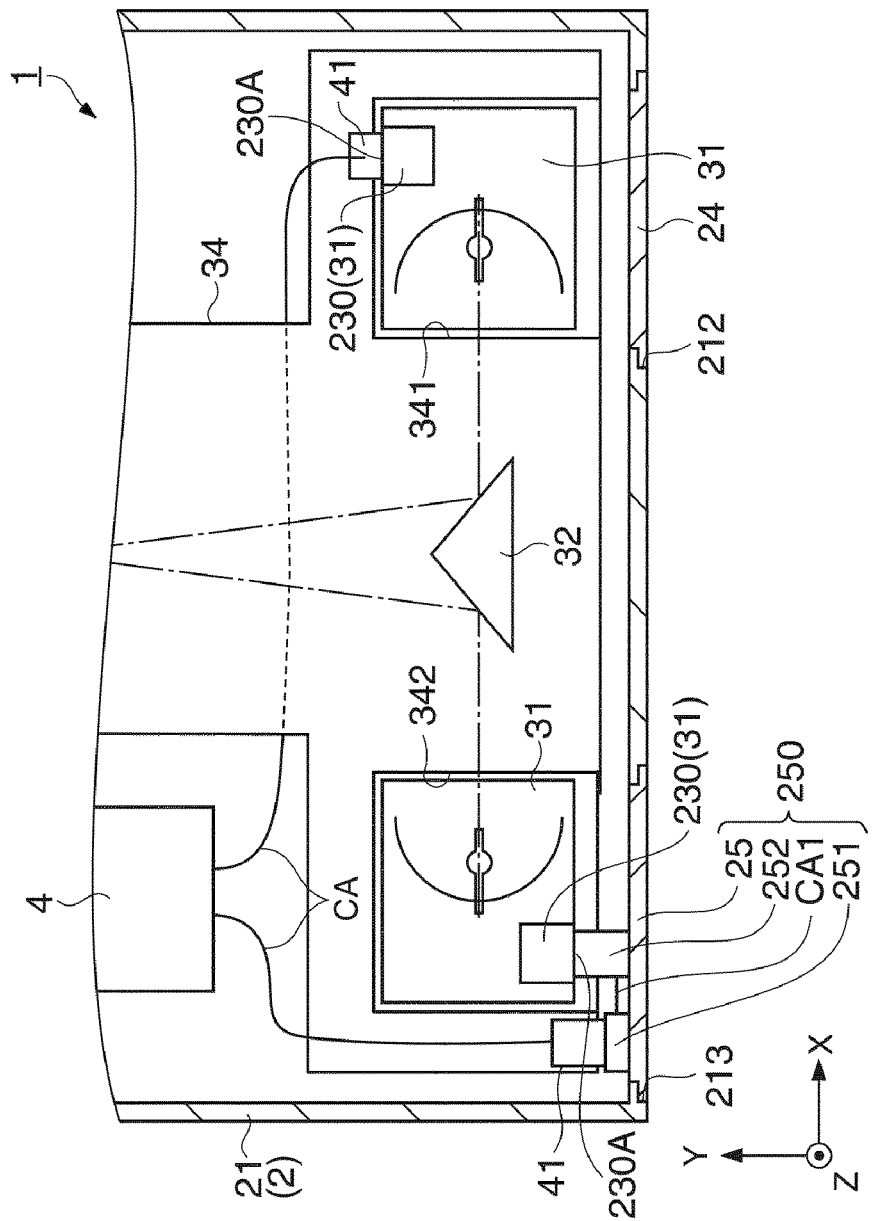
FIG. 9 is a plan view illustrating a rear part of a projector according to a fourth embodiment.

FIG. 9 is a plan view illustrating the rear part of the projector 1 according to this embodiment.

As illustrated in FIG. 9, the lid unit 250 has the lid member 25, connectors 251 and 252, and a cable CA1.

One of the two output terminals 41 is positioned at the light source storage unit 341, and the other output terminal 41 is disposed in the vicinity of the light source storage unit 342 and at the left end of the optical component housing 34.

The connector 251 is attached to the inside surface of the lid member 25 in such a position as to be connected with the output terminal 41 disposed at the left end of the optical component housing 34 when the lid member 25 closes the opening 213.

The connector 252 is attached to the inside surface of the lid member 25 in such a position as to be connected with the input terminal 230 of the light source device 31 stored in the light source storage unit 342 when the lid member 25 closes the opening 213.

The connector 251 and the connector 252 are connected with each other via the cable CA1.

The two light source devices 31 are inserted into the light source storage units 341 and 342 through the openings 212 and 213 similarly to the first embodiment. The input terminal 230 of the light source device 31 inserted into the light source storage unit 341 is connected to the output terminal 41 at the time of insertion similarly to the first embodiment. On the other hand, the input terminal 230 of the light source device 31 inserted into the light source storage unit 342 is connected with the connector 252 after insertion by closing the opening 213 by the lid member 25. By connection between the input terminal 230 and the connector 252, the output terminal 41 connects with the connector 251. As a result, power is allowed to be supplied from the power supply device 4 to the two light source devices 31.

As can be understood, the projector 1 according to this embodiment provides the following advantage as well as those of the third embodiment.

When the lid member 25 is removed from the opening 213, the cable CA does not come out. Thus, the processing for the cable CA is not required, and the operation for attaching and detaching the light source devices 31 can be facilitated.

Modified Example

According to the embodiments described herein, the following modifications and changes may be made.

According to the embodiments, the two light source devices 31 of the optical unit 3 are disposed inside the rear surface 21C. However, the two light source devices 31 may be disposed inside the side surface 21D or the side surface 21E. In this case, the openings 212 and 213 are formed on the side surface 21D or the side surface 21E at positions corresponding to the positions of the light source devices 31.

While the two light source devices 31 are provided in the embodiments, the number of the light source devices 31 may be three or larger.

According to the embodiments, the two light source devices 31 are disposed opposed to each other in such positions that the optical axes L1 and L2 extend in the left-right direction (±X direction). However, the two light source devices 31 may be disposed opposed to each other in such positions that the optical axes L1 and L2 are inclined to the left-right direction (±X direction).

According to the embodiments, the openings 212 and 213 are opened in the direction extending substantially orthogonal to the light emission direction from the light source storage units 341 and 342. However, the openings 212 and 213 may be opened in any directions crossing the light emission direction.

The cover 314 in the first embodiment is so designed as to shift in the up-down direction. However, the cover 314 may be rotated for shifting. Also, the cover 314 may be shifted such that the movement for exposing one input terminal is synchronized with the movement for covering and setting the other input terminal. The cover 314 may be provided at positions other than on the light source device 31 such as on the optical component housing 34 and the outer housing 2.

The cover 314 in the first embodiment may be a separate component attachable and detachable by the user.

The input terminals 130 in the second embodiment are rotated around the center axis extending in the light emission direction to be connected with the output terminals 41 disposed at the light source storage units 341 and 342. However, the input terminals 130 may be shifted by rotation or slide in other direction or a combination of those to be connected with the corresponding output terminals 41.

The projector 1 according to the embodiments includes the transmission type liquid crystal panel 3342 as the light modulation device. However, the light modulation device may be a reflection type liquid crystal panel. Alternatively, the light modulation device may be a device using a micromirror array or other devices.

What is claimed is:

1. A projector comprising:
a plurality of light source devices each of which has a light source;
an image projecting unit which modulates lights emitted from the plurality of light source devices according to image information to form image light, and projects the image light;
a power supply device which supplies power to the light source devices; and
an outer housing which accommodates the light source devices, the image projecting unit, and the power supply device, wherein:
the plurality of light source devices each have a same shape,
the plurality of light source devices each include an input plug having a first connecting side facing in a first direction relative to the light source device and a second connecting side facing in a second direction opposite the first direction,
a plurality of light source storage units, each of which accommodates the corresponding one of the plurality of light source devices, are provided inside the outer housing,
a plurality of openings through which the light source devices are attached and detached in the side direction of the outer housing are formed on the outer housing,
a first light source device of the plurality of light source devices is inserted into a first light source storage unit of the plurality of light source storage units through a first opening of the plurality of openings such that the first connecting side of the input plug of the first light source device is engaged with a first output terminal of the power supply,
a second light source device of the plurality of light source devices is inserted into a second light source storage unit of the plurality of light source storage units through a second opening of the plurality of openings such that the second connecting side of the input plug of the second light source device is engaged with a second output terminal of the power supply, and
the same surfaces of the first and second light source devices are located on the upper sides of the first and second light source devices.

2. The projector according to claim 1, wherein:
the plurality of light source devices are accommodated in the light source storage units in such positions that the emission sides for emitting the lights are opposed to each other; and
the opening is formed on the surface on the side of the outer housing in the direction for emitting the lights from the light source devices.

3. The projector according to claim 1, wherein:
the power supply device includes a plurality of output terminals for supplying power to the light source devices, the plurality of output terminals including the first and second output terminals.

4. The projector according to claim 1, wherein:
each of the plurality of light source devices includes a first cover covering the first connecting side of the input plug and a second cover covering the second connecting side of the input plug.

5. The projector according to claim 4, wherein:
each of the first and second covers shifts to expose the connecting side of the input plug connected with the corresponding output terminal and cover and set the connecting side of the input plug not connected with the output terminal when the light source devices are inserted into the light source storage units.

6. The projector according to claim 1, wherein
the power supply device includes a plurality of output terminals for supplying power to the light source devices, the plurality of output terminals including the first and second output terminals; and
the input plugs are shifted to be connected with the corresponding output terminals.

7. The projector according to claim 1, further comprising:
a lid member which closes the opening, wherein
the power supply device has a plurality of output terminals for supplying power to the light source devices, the plurality of output terminals including the first and second output terminals,
the output terminals are disposed at the light source storage unit and the lid member at positions corresponding to the positions of the input plugs of the light source devices accommodated in the plurality of light source storage units, the output terminal disposed at the lid member being connected with the corresponding input plug when the lid member closes the opening.

8. The projector according to claim 1, wherein
each of the light source devices has a projection exposed through the opening to be held when the light source devices are accommodated in the corresponding light source storage units.

* * * * *